United States Patent Office 3,483,001
Patented Dec. 9, 1969

3,483,001
PRODUCT AND PROCESS FOR PRODUCING A DRIPLESS FROZEN CONFECTION WITHOUT OVERRUN
Frank Hollis, Jr., Hillsdale, N.J., and Charles Jay Tressler, Jr., Hawthorne, N.Y., assignors to General Foods Corporation, White Plains, N.Y., a corporation of Delaware
No Drawing. Filed Dec. 5, 1966, Ser. No. 598,904
Int. Cl. A23g 5/00
U.S. Cl. 99—136                10 Claims

ABSTRACT OF THE DISCLOSURE

A frozen confection has been produced which has a reduced tendency to drip when thawing. This confection contains, as the essential ingredients, a bland protein, a high melting-point fat and a hydrophilic colloid. The confection can be sold as a frozen product or it can be sterilized and packaged aseptically so that it can be sold as a shelf stable item. In the latter alternative the consumer need only freeze the confection in a home freezer prior to consumption.

BACKGROUND OF THE INVENTION

Frozen confection-type foods such as ice cream, frozen sherbets and ices are very popular among children and adults. These confections are usually very sensitive to heat and often begin to melt before they can be completely eaten. This problem is particularly acute during the summer, the season when they are most popular. The problem of dripping is more serious with young children who invariably eat the frozen confection too slowly and often end up with stained clothing because of the dripping of these confections.

Many attempts have been made to overcome the dripping difficulty common to most frozen confections. One method attempted has been the addition of gums, such as carboxymethylcelullose and alginic acid salts, to the frozen confection during its preparation. This expedient, however, has the disadvantage that a large amount of gum must be used to successfully cope with the dripping problem. When these gums are used in amounts effective to retard dripping they impart to the frozen confection undesirable qualities inherent in the gum, such as unpleasant taste or undesirable mouth feel.

The presently available frozen confections have the further disadvantage that they must be stored in the frozen state or else they will spoil. The lack of stability of these confections presents the inconvenience that these products cannot be stored on the pantry shelf prior to use and consequently take up much valuable freezer space. This is particularly annoying today since in the past few years freezer space has become much more valuable due to the advent of many new types of frozen foods.

ADVANTAGES AND OBJECTS OF THE INVENTION

The present invention provides a frozen confection product that is superior to the commercial frozen confections presently available. The above noted disadvantages of the popular frozen confections on the market have been, to a great extent, obviated in the instant product. For instance, the product of the present invention will not drip even though held by a child on a hot summer day for an unusually long period of time. Furthermore, this product has a very smooth texture and the desirable attribute of easy melt-away in the mouth. A further advantage of the product presented in one of the embodiments of the present invention over the prior art products is that it is shelf stable, i.e., it can be stored on the pantry shelf at room temperature for long periods of time without the danger of degradation or spoilage. The shelf stable product of this invention retains its creamy texture in spite of the fact that it has been subjected to high pressures during the sterilization process.

It is therefore an object of the present invention to provide an improved frozen confection having a smooth, creamy, firm texture. It is another object of the invention to provide a frozen confection that can be sold in the frozen state or sterilized and aseptically packaged to give it storage stability in its unfrozen state. It is a further object of the present invention to provide a frozen confection that can be eaten without the inconvenience of its dripping and causing a mess. These and other objects of the present invention will become apparent from the following description and examples.

DESCRIPTION OF THE INVENTION

A frozen confection, as the term is generally understood, means a frozen milk or water-ice product and includes such things as ice cream, custards, and flavored ice sherbets. The product contemplated in this invention does not properly fall into any of the foregoing frozen confection products. It possesses a high fat content, approximating that of rich ice cream, yet it is distinguished from ice cream in that ice cream is whipped during its preparation to increase its overrun whereas the instant product is not whipped and consequently has no overrun. The contemplated product is different than the presently available cream-based frozen on-a-stick products in that it can have a creamy texture and mouthfeel, yet will remain substantially dripless as it softens.

The product can be prepared in a variety of forms. For example, it can be mounted on a stick to be eaten as a frozen confection on a stick; it can be prepared in a sealed wrapper in bar form, so that when it is taken from the freezer the consumer need only tear open the package and eat the frozen confection in the same manner as he would eat a candy bar; it can be sandwiched between wafers and eaten in the form of a frozen confection sandwich; it can even be prepared in the shape of a cone-mounted frozen confection.

The product can also be prepared in a variety of flavors such as chocolate, vanilla, orange, cherry, etc. It differs from ordinary fruit flavored frozen confections in that it contains the same amount of fat as the chocolate flavored product; in other words, the fruit flavored embodiments of the present invention have the same smooth mouth-feel and firm texture that the chocolate flavored product has. Commercially available fruit flavored frozen confections, on the other hand, have a very low fat content and are made substantially of ice. Thus it can be seen that the line of products contemplated in the instant invention present a pleasant new concept in summer time dessert snacks.

The unique properties of the products of the instant invention are brought about by the use of a combination of a bland protein, a high melting point fat and a hydrophilic colloid. The protein source can be a milk protein-containing substance such as whole or skimmed milk, dry whole or non-fat milk solids, or isolated milk protein matein materials such as coprecipitated milk protein (casein, lactalbumin and β-lactoglobulin). Other dairy products can also be used as a source of protein such as ricotta or other bland flavored cheeses. Although the foregoing protein sources are preferred, other generally bland proteins such as soy protein or physiologically acceptable salts of casein or other proteins may be used. The amount of protein used in the confection can vary between 2 and 15% by weight depending upon the eating qualities desired. The preferred amount varies between 3 and 7% by weight.

The second essential component of this product is a high melting point fat. It is essential that the fat used in the instant products have a sufficiently high melting point so that the ability of the dessert snack to remain dripless will not be impaired. On the other hand, if the melting point of the fat is too high the fat will affect the smooth mouthfeel of the product and will cause portions of it to adhere to the inside of the mouth of the consumer. To avoid imparting these undesirable characteristics to the frozen confections of the invention the melting point range of the fat to be used in the product should be from about 80 to 110° F. and preferably from about 90° to 100° F. Typical of the fats which can be used in the instant products are hydrogenated vegetable oils, such as coconut, cottonseed and peanut oils.

The quality of the dessert snacks disclosed herein will also depend upon the amount of the fat used in the product. If high amounts are used, such as in the range of 15–20%, a product is obtained that has smooth meltaway. However, when the fat content of the product is in the neighborhood of 3–5% a product is obtained that is similar in texture to the presently commercially available chocolate flavored ices. Thus, the fat content contemplated in the present invention can vary from 3 to 20% by weight depending upon the eating qualities and caloric value desired in the dessert snack. The preferred amount is about 10 to 15% by weight.

The third ingredient essential in the preparation of the instant product is a hydrophilic colloid. The amount of hydrophilic colloid used depends on the eating qualities desired in the product. If a product having a low solids content is desired then large amounts of hydrophilic colloid should be used in the product. This type of product is convenient for those consumers who are watching their weight. Another result of using high amounts of a hydrophilic colloid and lower amounts of protein is that some of the chewy character of high protein foodstuffs is avoided. Thus, the eating qualities of the frozen confections can be easily regulated to suit the demands of the consumer public. Any of the common hydrophilic colloids can be used in the invention such as carrageenan extracts, including Eucheuma, Irish Moss and most of the common red seaweed algae. Other gums that are suitable for use in the instant invention are gelatin and insoluble alginate salts. The amount of gum added to the product can be varied to give a product having the desired solids content and texture. The amount of hydrophilic colloid used can vary between 0.1 and 1% by weight with the preferred range being between 0.15 and 0.7% by weight.

The product should also contain a sweetening agent. The preferred sweetening agents are the natural sweetening agents such as sugar, dextrose, lactose, fructose, malt syrup, honey and molasses. However, where it is desirable to provide a low calorie dessert snack, an artificial sweetener can be substituted for some or all of the natural sweetener. When an artificial sweetener is used a bulking agent may be required to increase the solids content of the confection. Other ingredients which can be added to the dessert product formulation are flavoring materials, such as vanillin, cocoa and imitation chocolate and fruit flavors, salt, and coloring.

The preparation of the product of one embodiment of the invention is as follows: The dry ingredients, such as sugar, protein and fat are blended thoroughly and dissolved and emulsified in an aqueous liquid which may be water, milk or aqueous protein isolate. The mixture may be heated if desired to increase the solubility or dispersability of the ingredients. The mixture is then poured into molds and frozen. After being frozen the confections are removed from the molds and packaged for use as a frozen dessert snack.

According to a second embodiment, a shelf stable confection product can be prepared as described in the following procedure. The dry ingredients are dissolved in an aqueous liquid such as water, milk or aqueous protein isolate and the mixture is heated to about 240° F.–300° F. This step serves to sterilize the confection and is necessary in preparing a shelf stable product since the bacteria normally present in the natural materials would quickly cause an unsterilized product to spoil. The product is then permitted to cool and is packaged aseptically. In an alternative sterilization procedure the liquid mixture is poured into flexible containers and heated to the sterilization temperature under a pressure sufficient to prevent the package from exploding from the internal pressure created in the product at the sterilization temperature. In this process micro-wave heating can be conveniently used to raise the dessert blend to the sterilization temperature without damaging the container.

In order that the invention can be better understood the following examples will serve to illustrate specific applications of the invention.

EXAMPLE I

A frozen chocolate dessert confection was prepared using the following formulation:

| Ingredient: | Weight percent |
| --- | --- |
| Water | 54.00 |
| Sugar | 22.35 |
| Hydrogenated vegetable oil | 11.20 |
| Non-fat milk solids | 7.45 |
| Cocoa | 3.75 |
| Dry malt syrup | 0.54 |
| Imitation chocolate flavor | 0.37 |
| Calcium carrageenan | 0.19 |
| Salt | 0.10 |
| Vanillin | 0.05 |

The product was made according to the following procedure:

The non-fat milk solids, sugar and calcium carrageenan were dissolved in the water which had been previously heated to 190° F. The oil, cocoa and flavoring were then added and the mixture homogenized to form a uniform emulsion. The mixture was then poured into three fluid ounce commercial stainless steel molds. Sticks were inserted in the molds and the confections were frozen at −30° F. for three hours.

The frozen confections were stored at −10° F. for 24 hours with a commercial chocolate frozen confection. After this period, one of the above prepared samples and the commercial sample were mounted in the upright position by forcing the sticks of the confection down into a polystyrene foam mat. The samples were then subjected to a temperature of 80° F. to evaluate dripping characteristics. The commercial frozen confection began to drip after six minutes, while the sample prepared above remained dripless for thirty minutes, at which time it fell from the stick.

EXAMPLE II

A shelf-stable chocolate confection was prepared according to the following procedure using the above formulation. The ingredients were homogenized according to the procedure of Example I, after which the homogenized mixture was heated by means of a heat exchange unit to 300° F. The mixture was held at this temperature for one minute after which it was reduced to 250° F. and packaged under pressure in 1¼ oz. aluminum foil pouches. These pouches were then hermetically sealed and the temperature was reduced to room temperature. The samples were stored at room temperature for six weeks after which they were examined and found to contain no bacterial growth. The samples were then frozen and evaluated. The product was found to have an excellent flavor and texture and possessed the same dripless characteristics as the Example I sample.

EXAMPLE III

A vanilla flavored frozen confection was prepared using the following formulation.

| Ingredient: | Weight percent |
|---|---|
| Milk | 71.5 |
| Sugar | 12.0 |
| Hydrogenated vegetable oil | 7.0 |
| Coprecipitated milk protein (CaSal 6S, Crest Foods Co.) | 4.0 |
| Non-fat milk solids | 4.0 |
| Gelatin | 0.5 |
| Vanilla extract | 1.0 |

The confection was prepared and frozen according to the procedure of Example I. The sample was evaluated and was found to have excellent taste and textural qualities and the same dripless characteristics as the Example I sample.

Although the present invention has been described with particular reference to specific examples it should be understood that the invention is not limited thereto, and, therefore, reference should be had to the appended claims for definition of the limits of the invention.

What is claimed is:

1. A frozen confection produced without overrun, and characterized by resistance to dripping while thawing from the frozen state comprising, an emulsion containing 3% to 20% hydrogenated vegetable fat having a melting point of about 80° to 110° F. 2 to 15% bland protein, and 0.1 to 1.0% hydrophilic colloid, said confection having a total solids content of 35 to 55%.

2. A product according to claim 1 wherein said confection contains a sweetener.

3. A product according to claim 2 wherein said confection contains 45-65% of a liquid selected from the group consisting of milk and water.

4. The product of claim 2 wherein said sweetener is a natural sweetening agent and is present in an amount of about 10 to 30% by weight.

5. The product of claim 2 wherein said sweetener is an artificial sweetener.

6. A product according to claim 2 wherein said protein is selected from the group consisting of milk protein, bland cheese protein, soy protein and physiologically acceptable salts of casein.

7. A frozen confection produced without overrun, and characterized by resistance to dripping while thawing from the frozen state comprising, an aqueous emulsion containing 10 to 15% hydrogenated vegetable fat having a melting point of about 90 to 100° F., 3 to 7% bland protein, 0.15 to 0.7% hydrophilic gum, 15 to 25% sugar and a total solids content of about 40 to 50%.

8. A shelf stable confection adaptable to freezing without whipping, to produce a product resistant to dripping while thawing comprising, an aqueous emulsion of about 3 to 20% hydrogenated vegetable fat having a melting point of about 80° to 110° F., 2 to 15% bland protein, and 0.1 to 1.0% hydrophilic colloid, said confection having a total solids content of about 35 to 55%.

9. The product of claim 8 wherein said confections contains a sweetener.

10. A product of claim 8 wherein said confection emulsion is sterilized and aseptically packaged in a sealed container.

References Cited

UNITED STATES PATENTS

| | | | |
|---|---|---|---|
| 1,935,596 | 11/1933 | Fear | 99—136 |
| 2,002,963 | 5/1935 | Schade | 99—136 |
| 2,233,178 | 2/1941 | Otting et al. | 99—136 |
| 2,767,098 | 10/1956 | Fear | 99—136 |
| 2,876,104 | 3/1959 | Bliudzius et al. | 99—136 XR |
| 2,877,121 | 3/1959 | Anderson et al. | 99—136 XR |

OTHER REFERENCES

Schwitzer: "Margarine and Other Food Fats," Interscience Publishers Inc., New York, 1956, p. 9.

ALVIN E. TANENHOLTZ, Primary Examiner

J. M. HUNTER, Assistant Examiner

U.S. Cl. X.R.

99—137